United States Patent [19]

Christensen

[11] Patent Number: 5,146,584
[45] Date of Patent: Sep. 8, 1992

[54] KEYBOARD INTERFACE SYSTEM ALLOWING A SYNCHRONOUS KEYBOARD TO COMMUNICATE WITH A HOST PROCESSOR ASYNCHRONOUSLY BY MANIPULATING THE KEYBOARD CLOCK'S STATE

[75] Inventor: Mark E. Christensen, Holden, Mass.

[73] Assignee: Data General Corporation, Westboro, Mass.

[21] Appl. No.: 316,357

[22] Filed: Feb. 27, 1989

[51] Int. Cl.$^5$ ............................................. G06F 3/023
[52] U.S. Cl. ..................................... 395/550; 395/800; 364/928; 364/234; 364/DIG. 1; 364/DIG. 2
[58] Field of Search ... 364/200 MS File, 900 MS File; 341/20, 21, 22, 23, 24, 25, 26, 27, 28, 29, 30; 395/DIG. 1 MS File, DIG. 2 MS File, 550, 800

[56] References Cited

U.S. PATENT DOCUMENTS

| | | | |
|---|---|---|---|
| 4,460,957 | 7/1984 | Eggebrecht et al. | 364/200 |
| 4,644,497 | 2/1987 | Tajima et al. | 364/900 |
| 4,964,075 | 10/1990 | Shaver et al. | 364/900 |

*Primary Examiner*—Thomas C. Lee
*Assistant Examiner*—Robert B. Harrell
*Attorney, Agent, or Firm*—Robert Dulaney

[57] ABSTRACT

An apparatus and method for handling data transfer between a synchronous keyboard and a host processor is disclosed. An asynchronous receiver/transmitter is employed in conjunction with logic for controlling the keyboard clock and data lines to permit the receipt of data from and the transmittal of data to the keyboard in a pseudo-synchronous manner.

6 Claims, 3 Drawing Sheets

KEYBOARD INTERFACE SYSTEM ALLOWING A SYNCHRONOUS KEYBOARD TO COMMUNICATE WITH A HOST PROCESSOR ASYNCHRONOUSLY BY MANIPULATING THE KEYBOARD CLOCK'S STATE

BACKGROUND OF THE INVENTION

1. Field of the Invention

The present application relates generally to data processing systems and more particularly to apparatus for controlling data transfer between a keyboard and its associated host processor.

2. Description of the Prior Art

Prior art keyboards commonly contain logic to repetitively scan all keys and, in response to a detected change in key position, generate a scan code containing information descriptive of the keystroke. When a scan code is available for transmission to the keyboard's associated system and if the associated system is configured to receive the keyboard data, the data is transmitted by the keyboard. Many keyboards transmit and receive this data serially in a synchronous fashion. This synchronous mode of data transmission typically requires the serial data stream, representing the keystroke information from the keyboard or command information to the keyboard, to be accompanied by a "clock" signal generated by the keyboard which allows the data to be properly received.

The common method of controlling data transmission to and from such keyboards is by means of a single-chip microprocessor programmed to support the keyboard's serial interface and located in the system to which the keyboard is attached. In a typical prior art system, in addition to handling the receipt of data from the keyboard and the transmitting of data to the keyboard, the keyboard controller checks parity of a received byte, inserts a parity bit into a byte to be transmitted, translates the scan code from the keyboard into appropriate keystroke information and makes keystroke information and transmission error information available to the system.

Such a microprocessor-based keyboard controller, however, can represent a significant cost item in the price of the system. The cost of the microprocessor can become especially significant in regard to products, such as personal computers, which are highly competitive, price sensitive and involve high production volumes. The present invention relates to a novel design for keyboard interface control logic that is substantially less expensive to implement than prior art microprocessor based systems.

SUMMARY OF THE INVENTION

The present invention relates to apparatus for handling data transfer between a synchronous keyboard and a system processor. The apparatus includes an asynchronous receiver/transmitter and associated control logic. Certain functions, such as scan code decoding and overall system control, are performed by the system host processor.

It is a feature of the invention that the keyboard control logic can be implemented at significantly lower cost compared to microprocessor-based keyboard controllers.

Other features and advantages of the present invention will be understood by those of ordinary skill in the art after referring to the detailed description of the preferred embodiment and drawings herein.

DESCRIPTION OF THE PREFERRED EMBODIMENT

Figure 1:
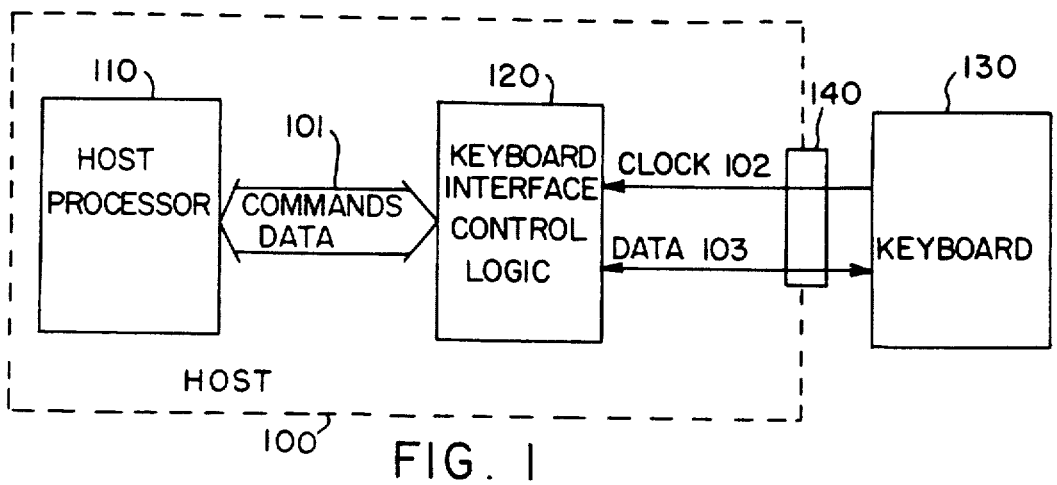
FIG. 1 is a simplified block diagram of a keyboard control system embodying the invention.

Looking first at FIG. 1, a simplified block diagram of a host/keyboard system is shown. As will be well understood by those skilled in the art, the various signals commonly interchanged among the know elements in prior art keyboard communication systems are well understood and, for clarity of presentation, signals not relevant to the description and understanding of the invention have not been shown.

FIG. 1 shows host processor 110 which sends data and commands to, and receives data from, keyboard interface control logic 120 via bus 101. Keyboard interface control logic 120 communicates with keyboard 130 via clock line 102 and data line 103. The typical ground and +5 v lines between host 100 and keyboard 130 are not shown. Connector 140 provides the means of physical connection between the keyboard and the host system.

In common prior art configurations, keyboard interface control logic 120 would be a microprocessor, such as an Intel Corporation 8042, which would control keyboard protocol and handle the assembly, disassembly and interpretation of keyboard scan codes. In the system disclosed herein, keyboard interface control logic 120 performs the assembly/disassembly of the scan code byte while the host processor performs the interpretation of the scan code and the handling of the line protocol. The method and manner of interpreting scan codes and programming host processor 110 to implement the protocol discussed below are well understood by those of ordinary skill in the art.

Keyboard 130 is a synchronous device which, as will be discussed, is implemented in a "pseudo-synchronous" system. Data is clocked in and out of the keyboard in accordance with clock line 102. The source of the signal on clock line 102 is controlled by keyboard interface control logic 120. As will be discussed in more detail below, keyboard interface control logic in conjunction with software signals from host processor 110 manipulates clock line 102 and data line 103 to achieve the receipt of data from and the providing of data to keyboard 130.

The source of the data and clock lines is typically an open collector device located on the keyboard. Either the keyboard or the system can force the line low. When no communication is occurring, clock line 102 is generally held high. Keyboard transmission will not occur if the host has forced clock line 102 low.

Data transmissions to and from the keyboard are sent serially over data line 103. Each transmission consists of 11 bits: a start bit, eight data bits, a parity bit and a stop bit. The method for accomplishing this transmission is discussed in more detail below.

Keyboard interface control logic 120 requires no modification to the keyboard or its operations. Therefore, the keyboard will continue to operate in what appears to the keyboard to be its normal manner. When the keyboard wants to send keystroke data to the host, it checks the clock and data lines for either a keyboard-inhibit (clock line low/data line high) or a request-to-send (clock line low/data line low) condition. If either of these conditions is present, the keyboard data is temporarily stored in the keyboard buffer until the next opportunity to transmit.

If both the clock and data lines are high, the keyboard is permitted to output data and the eleven bits of the transmission are sent. During the transmission, the keyboard repetitively checks the clock line. If the clock line is pulled low by the host prior to the occurrence of the leading edge of the 10th bit (parity bit), the keyboard will stop its data transmission. If the clock line is pulled low after the occurrence of the leading edge of the 10th bit, the transmission will be completed. As discussed below, the host system will inhibit the keyboard after each transmission until the received data is processed and any necessary responses to the keyboard are sent.

In regard to data transmissions from the host, the keyboard will repetitively check the data clock lines for the request-to-send condition (data and clock lines both low). When the host is ready to transmit its data, the host allows the clock line to return to a high condition. The keyboard will then clock in the 11 bits of the transmission. The keyboard indicates to the host that the data has been received by forcing the data line low after the 10th bit. In the typical implementation of the 11 bit transmission, the 11th (stop) bit is always high. Therefore, if the keyboard finds the data line low after the 10th received bit, an error has occurred and the keyboard will request that the data be resent from the host. Typically, the keyboard will respond to every transmission from the host by sending back a confirming transmission.

Figure 2C:
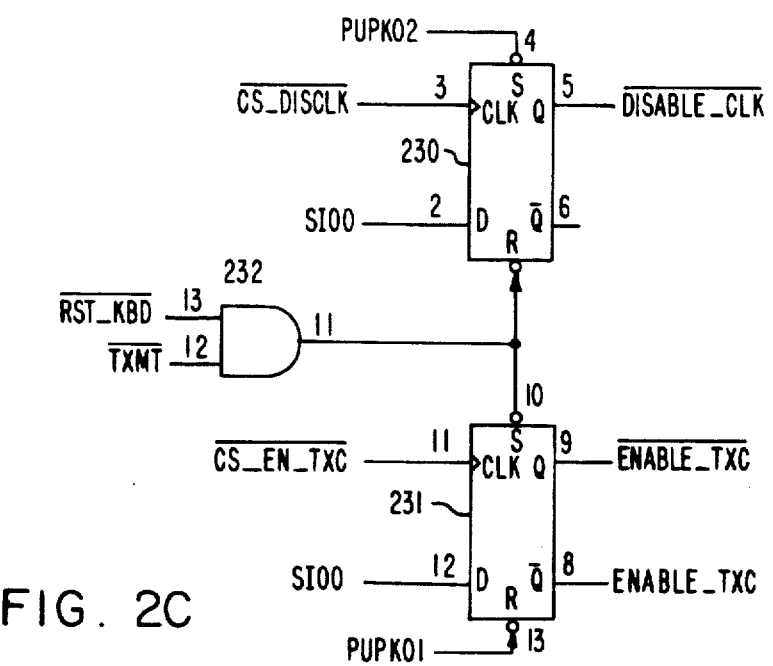
FIGS. 2A, 2B and 2C comprise a schematic diagram of keyboard interface control logic 120.
Figure 2A:
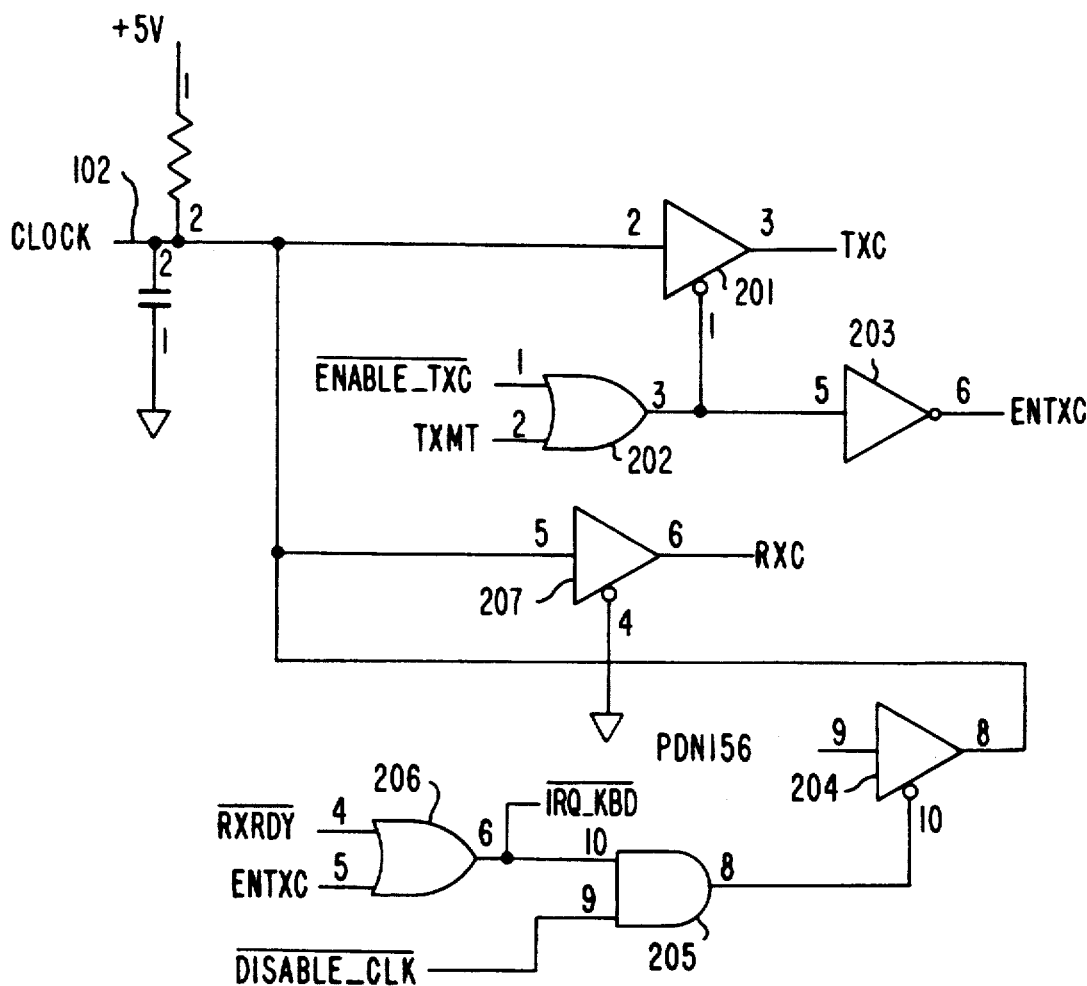
Figure 2A:
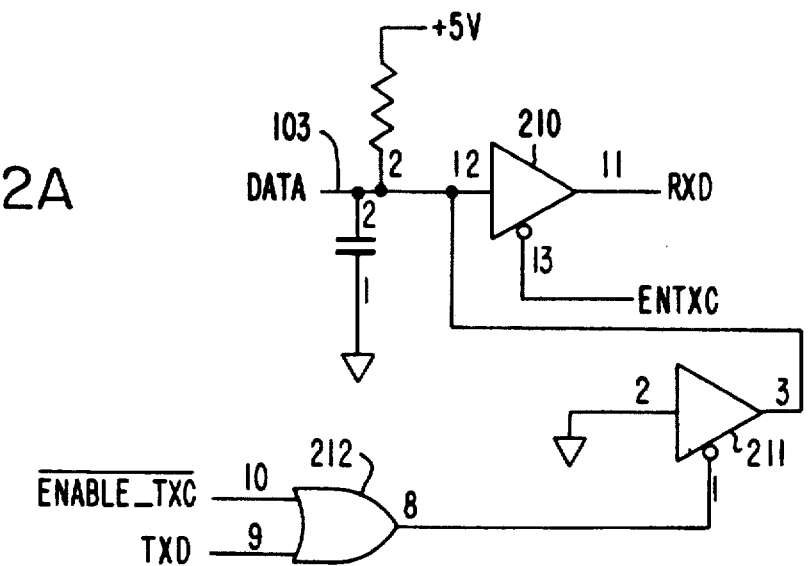
Figure 2B:
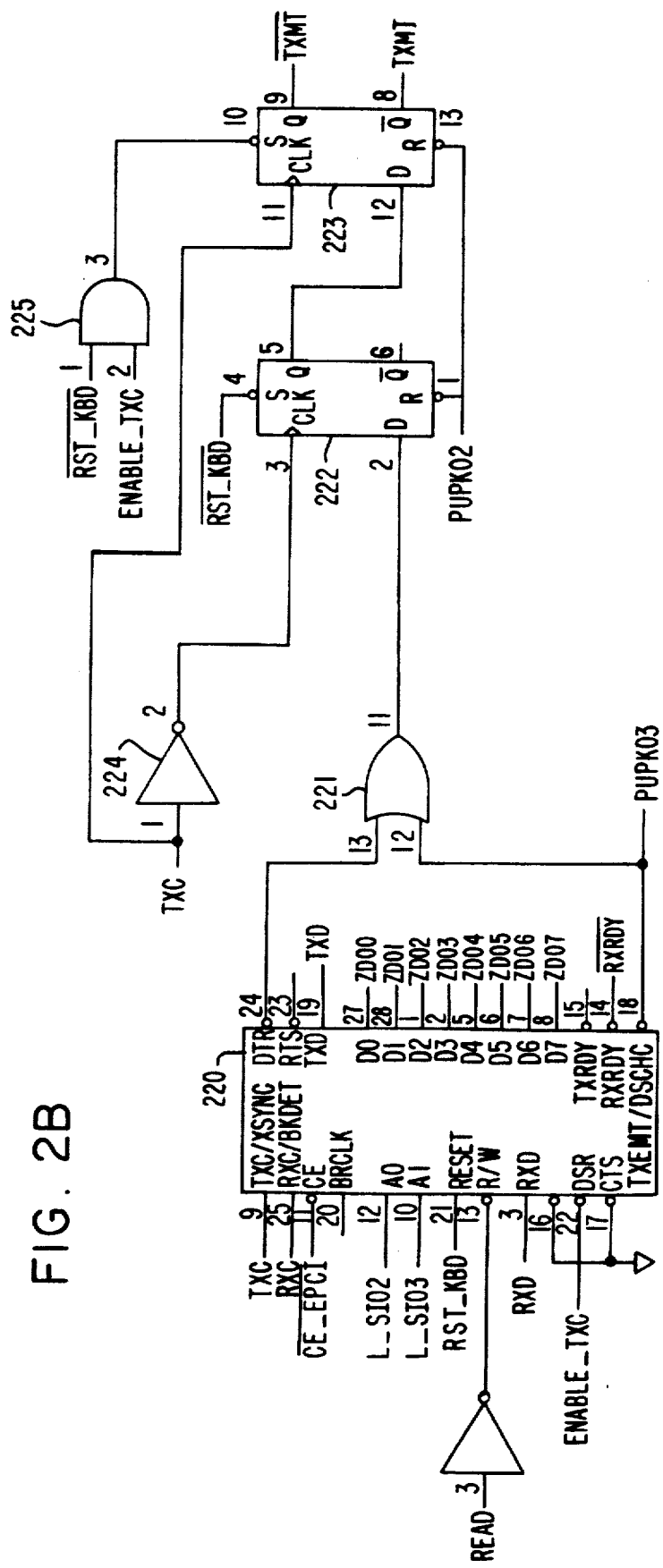

FIGS. 2A, 2B and 2C, viewed together, comprise a schematic of keyboard interface control logic (KICL) 120. Looking first at FIG. 2A, logic for controlling the keyboard clock and data lines is shown. The incoming clock signal on line 102 is provided through tristate buffer 201 to the TXC input of UART 220 (FIG. 2B) and through tristate buffer 207 to the RXC input of UART 220. The enabling input to buffer 201 is controlled by the output of gate 202. The keyboard clock signal is isolated from UART 220 when either $\overline{\text{ENABLE\_TXC}}$, indicating that the TXC input has been disabled, or TXMT, indicating that the UART 220 transmitter is empty (i.e. does not contain information awaiting transmission), are high. The output of gate 202 is inverted by inverter 203 and provided as ENTXC to gate 206 and tristate buffer 210.

The clock signal seen at the TXC input of UART 220 is also controlled by the output of tristate buffer 204 in accordance with the output of gate 205. As discussed below, the output of buffer 204 can act as source of the clock signal to TXC by manipulation of the output of gate 205 by means of the signal $\overline{\text{DISABLE\_CLK}}$, indicating that the clock signal from the keyboard is disabled. The output of gate 205 is also controlled by $\overline{\text{RXRDY}}$, indicating a received character is ready for input to the host, and ENTXC. $\overline{\text{IRQ\_KBD}}$ is provided to host processor 110 to indicate whether or not UART 220 has received a character and requires service.

Data is received from and sent to the keyboard over data line 103. Received data is supplied to the RXD input of UART 220 under control of tristate buffer 210, which is enabled and disabled by ENTXC. Serial data sent to the keyboard is provided from tristate buffer 211 under control of the output of gate 212. When $\overline{\text{ENABLE\_TXC}}$ is low, indicating the transmitter is enabled, the TXD serial data output from UART 220 will control the signal level seen at the enabling input of buffer 211 and, thereby, control the data signal provided to the keyboard.

UART 220 shown in FIG. 2B is in this embodiment a Signetics Corporation SCN2661 universal synchronous/asynchronous data communications controller. It will be understood that various other commercially available UART's could have been employed or that the functions of UART 220 could have been implemented in discrete logic.

The design, operation and functional characteristics of UART 220 are well understood by those of skill in the art. Looking briefly at the specific relevant inputs and outputs of UART 220, TXC is the clock signal used to transmit data from the UART. In this application, it is supplied externally. RXC is the clock signal used to clock received data into UART 220. Again, this signal is provided externally. CE is the chip enable signal, controlled by host processor 110. A0 and A1 are host processor 110 controlled lines to address one of the four internal UART 220 registers (mode register 1, mode register 2, command register and status register). RESET, controlled by the host processor, performs a master reset of the UART 220. R/W, controlled by the host processor, determines the read or write condition of UART 220. RXD is the serial data input to the UART receiver. DSR is a general purpose input implemented to force a low condition at TXEMT if ENABLE_TXC goes low. TXEMT indicates whether the transmitter has completed serialization of the last character received from the host. RXRDY indicates whether the receive data holding register has a character ready for reading by the host. D0-D7 provide the 8-bit parallel path for transfer of data, commands and status between UART 220 and host processor 110. TXD is the serial data output from the transmitter. DTR is a general purpose output, controlled by host processor 110 by means of the UART 220 command register. DTR is implemented to control whether or not TXEMT is allowed to inhibit keyboard data transmission. When UART 220 is configured to receive data, DTR will be low.

TXEMT and DTR are provided to gate 221, the output of which is provided as the data input to register 222. The Q output of register 222 is in turn connected to the data input of register 223. The TXC clock signal from buffer 201 is provided as the clocking signal to registers 222 and 223. Whenever ENABLE_TXC is low to gate 225, indicating the UART 220 transmitter is not enabled, register 223 will hold TXMThigh.

The general function of registers 222 and 223 is to delay the generation of TXMT, indicating that the transmitter is empty, for two TXC clock times. This is necessary since UART 220 is not operating in synchronous mode compatible with the typical synchronous operating mode of keyboard 130. TXEMT from UART 220 would normally indicate that the transmitter is empty after nine bits of data have been transmitted. To ensure that the final two bits (parity and stop bits) of the eleven bit transmission are transmitted the transmitter empty signal must be delayed beyond its normal generation time.

Logic for generation of the $\overline{\text{DISABLE\_CLK}}$ and $\overline{\text{ENABLE\_TXC}}$ signals is shown in FIG. 2C. Both signals can be generated under the control of host processor 110 by means of data signal SIOO and clocking signals $\overline{\text{CS\_DISCLK}}$ and $\overline{\text{CS\_EN\_TXC}}$ provided by host 110. As explained in more detail below, the ability to enable/disable the keyboard clock and the UART transmitter are useful in coordinating data transfer between the keyboard and UART 220.

The output of gate 232 is connected to the reset input of register 230 and the set input of register 231. $\overline{\text{RST\_KBD}}$, indicating keyboard reset, will remain high during normal system operations. Therefore, during normal operations, $\overline{\text{TXMT}}$ going low during transmission to the keyboard, indicating that the UART transmitter is empty, will operate to force $\overline{\text{DISABLE\_CLK}}$ low, thereby disabling the keyboard clock, and force $\overline{\text{ENABLE\_TXC}}$ high, thereby preventing the keyboard clock from being passed through to the UART 220 TXC input.

Operation

The states of clock line 102 and data line 103, and therefore the transfer of data to and from the keyboard, is under the control of host processor 110. The typical clock and data line protocol is given below:

| CLOCK | DATA | INTERFACE CONTROL |
|-------|------|-------------------|
| H | H | KEYBOARD PERMITTED TO OUTPUT DATA |
| L | H | KEYBOARD INHIBITED FROM OUTPUTTING DATA |
| L | L | HOST REQUESTS TO SEND TO KEYBOARD |
| H | L | KEYBOARD PERMITTED TO RECEIVE DATA |

Data Transmission from Keyboard

In general, the majority of data transmissions will be from the keyboard to the host. Transmissions from the host to the keyboard, such as commands to light LED's, are substantially less frequent. Therefore, the normal condition for the clock and data lines when no communication is occurring will be with both clock and data lines high, leaving the keyboard enabled to transmit data.

When the keyboard is ready to transmit data to the host, it checks the status of the data and clock lines. If a keyboard inhibit or request-to-send is detected, the data is stored in the keyboard data buffer until the data and clock lines allow transmission. If the data and clock lines are both high, the keyboard clocks out the 11 bit serial data stream. The keyboard continues to periodically check the clock line during the data transmission and, if the line has been forced low by the host and the transmission in not beyond the leading edge of the 10th bit, the keyboard will terminate the transmission.

In general, when configuring itself into a condition to accept data from the keyboard, the host system will perform the following steps: (a) ensure that the keyboard will not attempt to send additional data by forcing clock line 102 low (by clocking a low signal on line SIOO into register 230), (b) disable TXC by clocking a high signal on line SIOO into register 231, (c) enable the UART 220 receiver by setting the proper bits in the UART command register and (d) release the keyboard to drive the clock signal on line 102 by clocking a high signal on line SIOO into register 230.

Therefore, when in the condition to receive data from the keyboard, KICL 120 will be configured with buffers 201, 204 and 211 disabled and buffers 207 and 210 enabled, thereby allowing data from keyboard 130 to be passed through to the RXD input of UART 220 and the clock signal from keyboard 130 to be passed through to the RXC input.

Once a complete transmission has been received from the keyboard, the host system will perform the following steps: (a) further transmission from the keyboard will be temporarily inhibited by forcing clock line 102 low (by forcing $\overline{\text{DISABLE\_CLK}}$ low), (b) the received scan code will be transmitted to host processor 110, (c) host processor 110 will determine if the received scan code requires a transmission back to the keyboard, (d) if a transmission to the keyboard is required, the transmitting procedure, discussed below, will be initiated, and (e) if no transmission to the keyboard is required, the keyboard will be reenabled by returning the clock line high (by driving $\overline{\text{DISABLE\_CLK}}$ high).

Data Transmission To Keyboard

As mentioned above, UART 220 and keyboard 130 are not directly compatible and therefore cannot communicate without benefit of KICL 120. The particular protocol for sending data to the keyboard involves generation of pseudo-clock signals to ensure proper data handling by UART 220.

As mentioned above, each time a scan code is received from the keyboard, further transmissions are inhibited until host processor 110 determines whether a reply transmission to the keyboard is required. Since almost all transmissions from the host to the keyboard will be in direct response to a scan code just received from the keyboard, when host processor 110 determines that a transmission to the keyboard is required typically the data clock line will be being held low and TXC will not be enabled. (This is part of the normal protocol for receiving data from the keyboard described above.)

Under these conditions, if host processor 110 has data to be transmitted to the keyboard, the following steps will be performed: (a) the UART 220 receiver and transmitter are disabled by setting the proper bits in the UART command register, (b) the data from host processor 110 is loaded into the UART 220 transmit holding register, (c) the transmitter is enabled by setting the proper bit in the command register, (d) TXC is enabled by forcing $\overline{\text{ENABLE\_TXC}}$ low, thereby generating a falling edge of TXC, (e) after an appropriate time interval (a minimum of 0.5 microseconds in this embodiment), disable TXC, (e) after another similar time interval, again enable TXC, thereby generating a second falling edge of TXC, (f) after another similar time interval, again disabling TXC, (g) after another similar time interval, again enabling TXC, thereby generating a third falling edge of TXC (The "start" bit will be output from the TXD output of UART 220 at this point. This bit, always low, brings data line 103 low. The clock and data lines are both now low, indicating that the host requests to send data to the keyboard.), (h) after a suitable interval (in this embodiment, a minimum of 60 microseconds), releasing the keyboard clock by forcing $\overline{\text{DISABLE\_CLK}}$ high, allowing the keyboard to clock in the data, (i) checking status of the transmission by monitoring $\overline{\text{ENABLE\_TXC}}$, and (j) when the transmission is completed, configuring the system for receiving the next scan code from the keyboard. Normally, the keyboard will respond to each transmission from the host by sending an acknowledgement scan code.

The invention may be embodied in other specific forms without departing from the spirit or essential characteristics thereof. The scope of the invention is indicated by the appended claims rather than by the foregoing description, and all changes whichin the meaning and range of equivalency of the claims are therefore intended to be embraced therein.

I claim:

1. In a computer system having a synchronous keyboard, the keyboard having clock signal generation means; a host processor; and interface means connected between the keyboard and the host processor, the interface means having means for receiving serial data from the keyboard, means for providing serial data to the keyboard, means for receiving parallel data from the host processor, means for providing parallel data to the host processor, means connected to the serial data receiving means and the parallel date providing means for converting serial data from the keyboard to parallel form and means connected to the parallel data receiving means and the serial data providing means for converting parallel data from the host processor to serial form, a method for handling data transmissions from said keyboard comprising the steps of
   a) generating a keyboard clock signal,
   b) providing the keyboard clock signal to the interface means,
   c) clocking a scan code from said keyboard into said interface means in synchronization with said keyboard clock signal,
   d) when the entire scan code has been received by the interface means, inhibiting the keyboard clock signal,
   e) transmitting the received scan code in parallel from the interface means to the host processor,
   f) interpreting the received scan code to determine if a transmission from the host processor back to the keyboard in response to the scan code is required,
   g) if a transmission from the host processor back to the keyboard is not required, releasing the keyboard clock signal, and
   h) if a transmission from the host processor back to the keyboard is required, performing the transmission from the host processor back to the keyboard.

2. In a computer system having a synchronous keyboard, the keyboard having first clock signal generation means; a host processor; and interface means connected between the keyboard and the host processor, the interface means having means for receiving serial data from the keyboard, means for providing serial data to the keyboard, means for receiving parallel data from the host processor, means for providing parallel data to the host processor, means connected to the means for receiving serial data and the means for providing parallel data for converting serial data from the keyboard to parallel form, means connected to the means for receiving parallel data and the means for providing serial data for converting parallel data from the host processor to serial form, and second clock signal generation means, a method for handling data transmissions from the host processor to said keyboard comprising the steps of:
   a) inhibiting receipt of data by the serial data receiving means and inhibiting transmission of data by the serial data providing means,
   b) loading data to be transmitted to the keyboard from the host processor into the parallel data receiving means,
   c) enabling the serial data transmitting means,
   d) supplying the second clock signal to the serial data providing means to initiate data transmission to the keyboard,
   e) supplying the first clock signal to the serial data providing means to enable clocking of the transmission to the keyboard,
   f) monitoring for completion of data transmission, and
   g) when data transmission is complete, disabling the serial data transmission means and enabling the serial data receiving means.

3. Apparatus for controlling parallel-to-serial and serial-to-parallel data transfer between a host processor and a synchronous keyboard, said keyboard having keyboard clock signal generation means, said apparatus comprising:
   asynchronous data receiving means connected to said host processor and said keyboard, said asynchronous data receiving means including
      means for receiving data in parallel from said host processor;
      means for receiving a data receiving clock signal; and means for receiving data serially from said keyboard in synchronization with said data receiving clock signal,
   asynchronous data transmitting means connected to said host and said keyboard, said asynchronous data transmitting means including
      means for transmitting data in parallel to said host;
      means for receiving a data transmitting clock signal; and
      means for transmitting data serially to said keyboard in synchronization with said data transmitting clock signal; and
   clock signal control means connected to said keyboard, said asynchronous data receiving means, said asynchronous data transmitting means and said host processor, said clock signal control means including
      means for receiving the keyboard clock signal generated by the keyboard clock signal generation means;
      means, responsive to commands from said host processor, for supplying said keyboard clock signal to said asynchronous data receiving means as the data receiving clock signal;
      means, responsive to commands from said host processor, for supplying said keyboard clock signal to said transmitting means as the data transmitting clock signal,
      means for generating a second clock signal; and means, responsive to commands from said host processor, for supplying said second clock signal to said transmitting means as the data transmitting clock signal.

4. The apparatus of claim 3 wherein said clock signal control means further includes means, responsive to commands from the host processor, for inhibiting the generation of the keyboard clock signal.

5. Apparatus for controlling parallel-to-serial and serial-to-parallel data transfer between a host processor and a synchronous keyboard, said keyboard having keyboard clock signal generation means, said apparatus comprising:
   asynchronous receiver/transmitter means connected to said host processor and said keyboard, said asynchronous receiver/transmitter including
      means for receiving data in parallel from said host;

means for supplying data serially to said keyboard;
means for receiving data serially from said keyboard;
means for supplying data in parallel to said host; and
means for receiving a data clock signal; and clock signal control means connected to said keyboard, said receiver/transmitter means and said host processor, said clock signal control means including means for receiving the keyboard clock signal generated by the keyboard clock signal generation means;

means, responsive to commands from said host processor, for supplying said keyboard clock signal to said receiver/transmitter means as the data clock signal;

means for generating a second clock signal;

means, responsive to commands from said host processor, for supplying said second clock signal to said receiver/transmitter means as the data clock signal.

6. The apparatus of claim 5 wherein said clock signal control means further includes means, responsive to commands from the host processor, for inhibiting the generation of the keyboard clock signal.

* * * * *